(12) United States Patent
Voinea et al.

(10) Patent No.: US 9,529,823 B2
(45) Date of Patent: Dec. 27, 2016

(54) GEO-ONTOLOGY EXTRACTION FROM ENTITIES WITH SPATIAL AND NON-SPATIAL ATTRIBUTES

(75) Inventors: Daniel Voinea, Issy-les-Moulineaux (FR); Tomasz A. Marciniak, Bavaria (DE); Daniel Bernhardt, London (GB); Xavier Sloane Dupre, Paris (FR); Ian Hegerty, Andover (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 13/226,509

(22) Filed: Sep. 7, 2011

(65) Prior Publication Data

US 2013/0060764 A1    Mar. 7, 2013

(51) Int. Cl.
*G06F 7/00* (2006.01)
*G06F 17/30* (2006.01)

(52) U.S. Cl.
CPC .............. *G06F 17/30241* (2013.01)

(58) Field of Classification Search
CPC ............ G06F 17/30241; G06F 17/3087; G06F 17/30864; G06F 17/30274; G06F 17/30908
USPC .......................... 707/736, 743, 921, 737, 723
See application file for complete search history.

(56) References Cited

U.S. PATENT DOCUMENTS

| | | |
|---|---|---|
| 7,747,625 B2* | 6/2010 | Gargi et al. ................... 707/737 |
| 2004/0078490 A1 | 4/2004 | Anderson et al. |
| 2004/0143385 A1* | 7/2004 | Smyth ................. G08G 1/0104 701/117 |
| 2005/0091223 A1* | 4/2005 | Shaw et al. .................... 707/100 |
| 2006/0106778 A1* | 5/2006 | Baldwin .......................... 707/3 |
| 2009/0027412 A1* | 1/2009 | Burley et al. ................. 345/582 |
| 2009/0254547 A1* | 10/2009 | Hirota ............................... 707/5 |
| 2010/0257163 A1* | 10/2010 | Ohazama et al. ............ 707/724 |
| 2012/0290542 A1* | 11/2012 | Trotta et al. .................. 707/687 |

OTHER PUBLICATIONS

Author: Irad Ben-Gal; Title: Outlier Detection; Date: 2005; Publisher: Kluwer Academic Publishers, pp. 1-16.*
Author: Jones et al., date: 1999 Radical Eye Software, pp. 1-18.*
Borges, et al., "Discovering Geographic Locations in Web Pages Using Urban Addresses", Retrieved at <<http://homepages.dcc.ufmg.br/~clodoveu/files/100.40/AC040.%202007%20Discovering%20geographic%20locations%20in%20Web%20pages%20using%20urban%20addresses.pdf>>, Proceedings of the 4th ACM workshop on Geographical information retrieval, Nov. 6-10, 2007.
(Continued)

*Primary Examiner* — Md. I Uddin
(74) *Attorney, Agent, or Firm* — Jessica Meyers; Doug Barker; Micky Minhas

(57) ABSTRACT

Architecture that provides fully automatic generation of a geo-ontology and does not use pre-existing geo-ontologies or other location entity repositories (e.g., a licensed location). The architecture extracts the formal administrative structure of a geographical region of interest (e.g., country) (a geo-ontology of locations with attributes and relations) from a collection of entities with spatial attributes, extracts the informal administrative structure of a geographical region of interest (e.g., country) (informal administrative regions and names and informal neighborhoods and their attributes), and extracts location static rank features for all these entities (attributes used for ranking locations from the geo-ontology that appear in user queries).

20 Claims, 7 Drawing Sheets

(56) References Cited

OTHER PUBLICATIONS

Markowetz, et al., "Design and Implementation of a Geographic Search Engine", Retrieved at <<http://cis.poly.edu/suel/papers/geo.pdf>>, Eighth International Workshop on the Web and Databases, Jun. 16-17, 2005.
Fu, et al., "Building a Geographical Ontology for Intelligent Spatial Search on the Web", Retrieved at <<http://www.geo-spirit.org/publications/geoontology_DBA.pdf>>, Iasted International Conference on Databases and Applications, part of the 23rd Multi-Conference on Applied Informatics, Feb. 14-16, 2005.
Morimoto, et al., "Extracting Spatial Knowledge from the Web", Retrieved at <<http://mccurley.org/papers/SAINT03.pdf>>, Proceedings of the Symposium on Applications and the Internet, 2003.
Chen, Ren., "Ontology-based dynamic data gathering of geographic information services", Retrieved at <<http://ieeexplore.ieee.org/stamp/stamp.jsp?tp=&arnumber=5654850>>, International Conference on Future Information Technology and Management Engineering, Oct. 9-10, 2010.
Jones, et al., "The SPIRIT Spatial Search Engine:Architecture, Ontologies and Spatial Indexing", Retrieved at <<http://www.geo-spirit.org/publications/cbjone-giscience04.pdf>>, Proceedings of Third International Conference on Geographic Information Science, vol. 3234, Oct. 20-23, 2004.

\* cited by examiner

US 9,529,823 B2

GEO-ONTOLOGY EXTRACTION FROM ENTITIES WITH SPATIAL AND NON-SPATIAL ATTRIBUTES

BACKGROUND

Having an accurate geo-ontology (a database of locations and associated relations and attributes) is useful to solving search queries with local intent. Commercial geo-ontologies exist that are manually created/maintained or compiled from other existing location databases that were also manually created or compiled. However, the automatic generation of geo-ontologies is a significant challenge heretofore unmet due to the associated complexities.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture overcomes the existing challenges of geo-ontologies by providing fully automatic generation and does not use pre-existing geo-ontologies or other location entity repositories (e.g., a licensed location). The architecture extracts the formal administrative structure of a geographical region of interest (e.g., country) (a geo-ontology of locations with attributes and relations) from a collection of entities with spatial attributes, extracts the informal administrative structure of a geographical region of interest (e.g., country) (informal administrative regions and names and informal neighborhoods and their attributes), and extracts location static rank features for all these entities (attributes used for ranking locations from the geo-ontology that appear in user queries).

The architecture utilizes a collection of entities (e.g., the local business database/index in a country, private addresses, etc.) with spatial attributes (e.g., latitude longitude, geocodes, postcodes, etc.) to reconstruct the geo-administrative structure of a geographical region of interest (e.g., country). The spatially annotated entities are used to infer the list of geo-entities (e.g., cities, streets, etc.), the relations among elements (e.g., inclusion, proximity, etc.), element details (e.g., polygonal boundary) by grouping, segmenting, or filtering (e.g., clustering, segmentation, morphologic open-close operations, using a "fill-like" algorithm, and any other mathematical equivalents for these methods) based on different attributes of the entities. Informal regions of different granularity (e.g., cities, neighborhoods, historical regions) can be extracted in a similar way using a different feature space for clustering.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
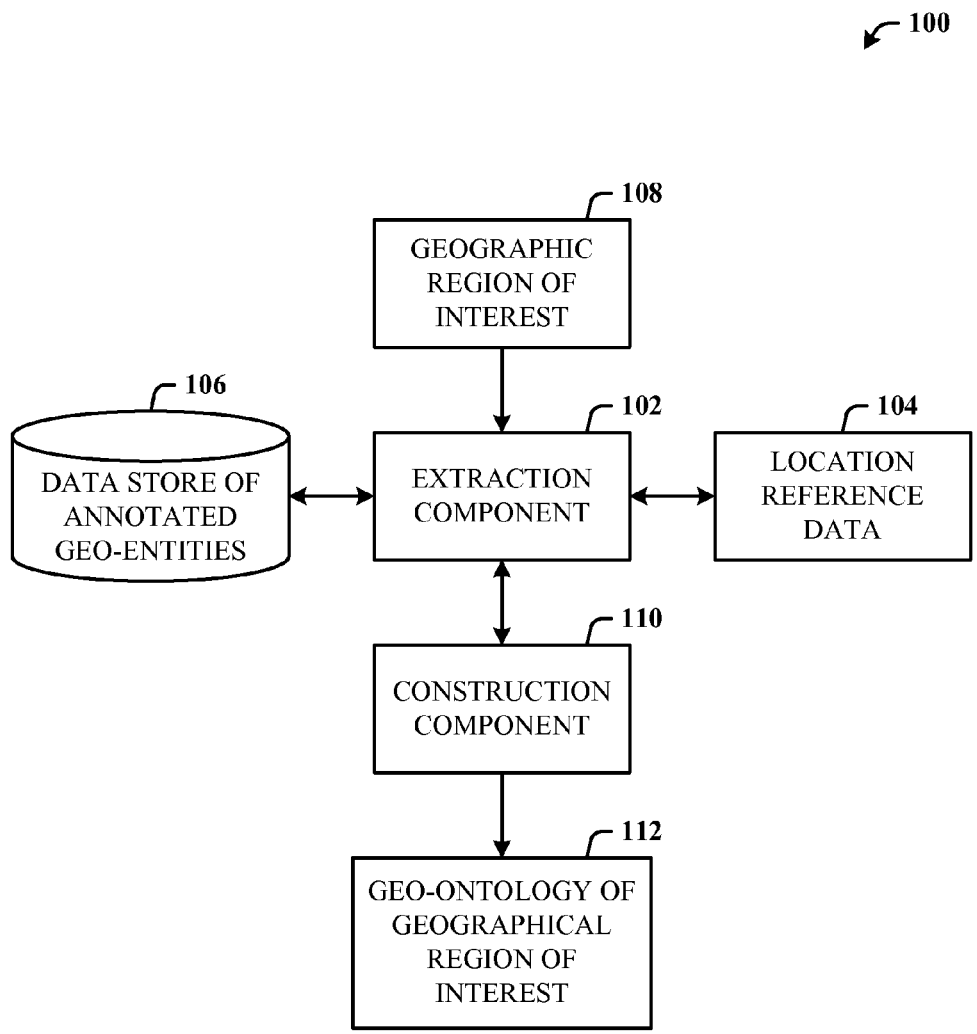
FIG. 1 illustrates a system in accordance with the disclosed architecture.

The disclosed architecture automatically extracts a geo-ontology of all locations (e.g., cities, administrative regions, neighborhoods, street data, street numbers, etc.) without using any pre-existing third-party geo-ontology data. The final geo-ontology comprises the location entities (e.g., names, aliases, latitude, longitude, polygon, etc.), the relations among elements, and inferred attributes that can be used for detecting the geo-entities in a user query and ranking these detected geo-entities.

A geo-ontology is a collection of locations (e.g., administrative regions, cities, neighborhoods, postcodes, villages, points of interest, historical regions, streets etc.), the relations between these locations (e.g., inclusion, adjacency etc.), attributes (e.g., center, polygon/boundary, static rank/importance), and the aliases/alternative names/misspellings along with the static rank (importance) of the aliases.

In addition to the obtainment of location aliases (colloquial names) and boundaries for informal (non-official), the architecture also facilitates the obtainment of administrative regions at different granularities (e.g., city neighborhoods and historical/informal region names).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 includes an extraction component 102 that automatically extracts location reference data 104 from a data store of geo-entities 106 annotated with spatial location attributes. The location reference data 104 is related to a geographic region of interest 108. A construction component 110 automatically constructs a geo-ontology 112 of the geographic region of interest based on the location reference data 104.

The geo-ontology 112 includes at least one of the geo-entities, relationships between the geo-entities, aliases, or inferred attributes used for detecting geo-entities in a user query and ranking the detected geo-entities. The geo-ontology 112 includes a formal administrative structure of the geographic region of interest 108. The geo-ontology 112 includes an informal administrative structure of the geographic region of interest 108. The extraction component 102 extracts a measure of relative importance of the geo-entities. The extraction component 102 further considers non-spatial location attributes related to the geographic region of interest 108. The spatial location attributes and non-spatial location attributes are employed to associate each geo-entity with a point on a map to generate a point cloud for processing. The geo-ontology 112 includes aliases and alternative names generated during clustering and segmentation of clouds of points. The extraction component 102 infers a relationship between geo-entities based on an is-close/related-to relation.

Figure 2:
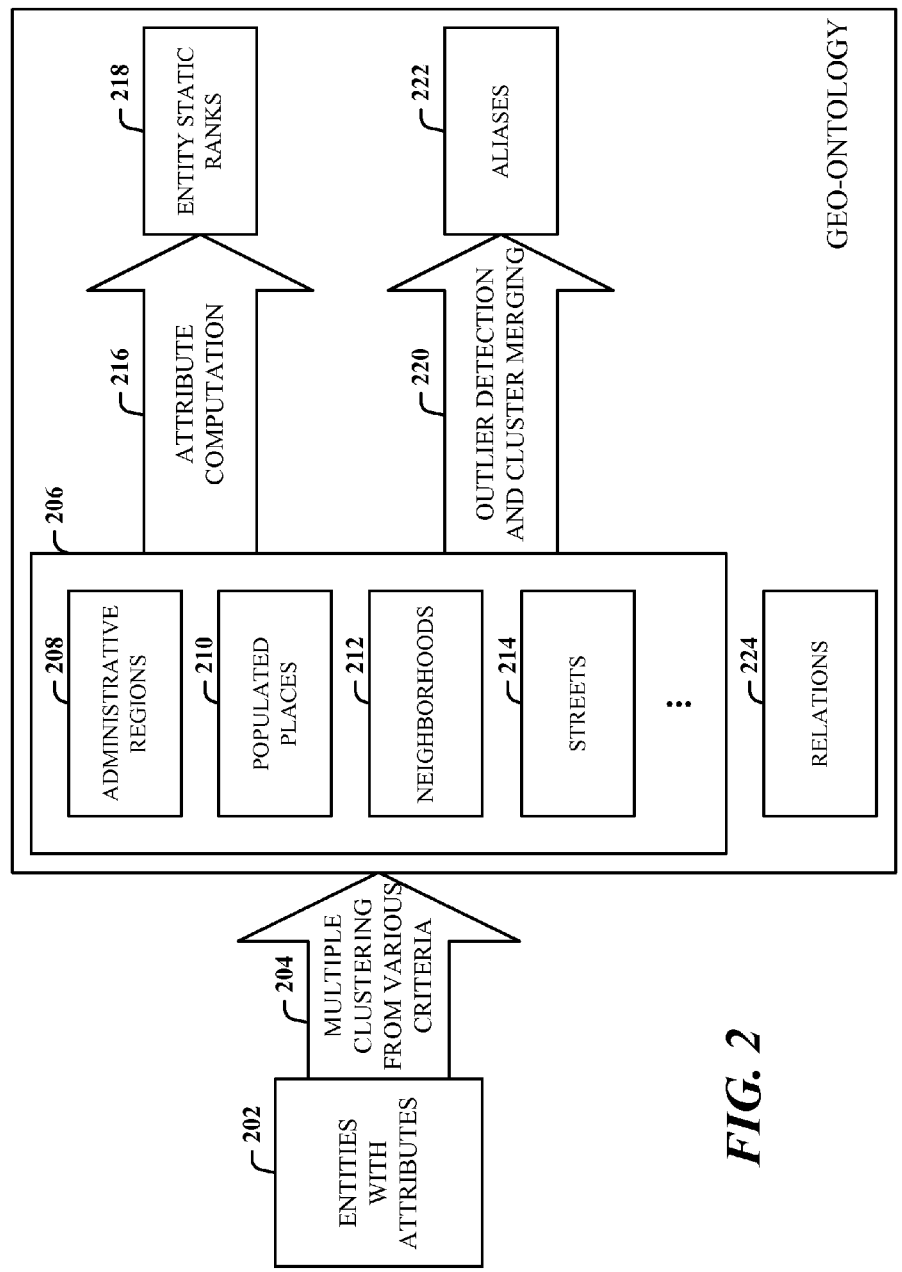
FIG. 2 illustrates a flow diagram for the automatic extraction of a geo-ontology from entities having spatial and non-spatial attributes.

FIG. 2 illustrates a flow diagram 200 for the automatic extraction of a geo-ontology from entities having spatial and non-spatial attributes. The architecture extracts the locations, the location attributes, and the administrative structure of the country from a set of entities with spatial attributes.

A collection of entities (e.g., the local business database/index in a country, private addresses, etc.) with spatial attributes (e.g., latitude longitude, geocodes, postcodes, etc.) is utilized to reconstruct the geo-administrative structure of a geographical region of interest (e.g., country). The spatially-annotated entities are used to infer the list of geo-entities (e.g., cities, streets etc.), the relations among elements (e.g., inclusion, proximity), entity details (e.g., polygonal boundary) by grouping, segmenting, and/or filtering the details (e.g., clustering, segmentation, morphologic open-close operations, using a "fill-like" algorithm, and/or any other mathematical equivalents for these methods) based on different attributes of the entities. Informal regions of different granularity (e.g., cities, neighborhoods, historical regions, etc.) can be extracted in a similar way using a different feature space for clustering.

The static rank attributes (along with relation information and other attributes) can be used to recall the correct location in a user query (e.g., distinguish between London, Canada, and London, England, in a query "hotels in london").

Referring to FIG. 2, the input of the pipeline diagram 200 includes a set of entities 202 (e.g., businesses, private addresses, events, etc.) with any form of usable spatial location attributes (e.g., latitude/longitude, fine granularity postcodes, geocodes) and non-spatial location attributes (e.g., structured or semi-structured address text). Based on the spatial and non-spatial location attributes, each entity and its metadata are associated with a point on a multi-dimensional (e.g., 2D) map. Combining all of those points creates a point cloud for further processing.

Several clustering/segmentation steps 204 are applied on a combination of the entity's location fields (text/non-spatial and spatial) to obtain location entities 206 of different granularities based on the point clouds formed by the filtered entities. The different granularities include administrative regions 208, populated places 210, neighborhoods 212, streets 214, and so on. Information such as polygonal boundary, best center, relative importance (e.g., if multiple cities exist with the same name), size, aliases, most popular name, and name of parent entity can be inferred from the point cloud. Attribute computation 216 facilitates the output of entity static ranks 218. Outlier detection and cluster merging 220 facilitates the detection of aliases. Re-clustering outliers can be used to provide popular misspellings.

Depending on country and language, informal administrative regions can be extracted using clustering based on location entity name sub-tokens and other properties. Informal city neighborhood entities can be extracted by a form of clustering on business names sub-tokens.

Consider a first example of extracting the formal geo-ontology, the boundaries, the relations 224, and the static ranks 218. Assuming the set of entities is a business database and the given spatial attributes are the latitude and the longitude for each entity, a business entity contains the street number, street name, city, county, state, and a point on a map provided by the business owner that translates into a latitude/longitude pair. For example, the case of all the entities that have 'Paris' in the city field—when plotted on a world map these entities form two distinct clouds of points (a cloud centered on Paris, France, and a cloud centered on Paris, Tex.).

The polygonal boundary of a location entity can be extracted. Using clustering (or any other mathematically equivalent method) the boundaries (bounding box/polygon) of the N=2 cities, in this example, can be extracted based on the cloud boundaries. The same applies for the clouds of points with neighborhood=downtown (N=hundreds), or postcode=10010 (N=dozens across countries).

Relations 224 can be inferred. Using spatial inclusion, for example, it can be deduced that the cloud of points that is now assigned to Paris, France, is a sub-cloud of another cloud called "Ile de France" (the administrative region extracted in the same way), and more generically, a sub-cloud of the bigger cloud "France". This defines the relations between the entities in the geo-ontology.

Another indicator of inclusion is the name match of the parent cloud (e.g., all businesses corresponding to points in Paris, France, cloud will have "France" as the country text field, which is also the name of the parent cloud). Another type of relation that can be deduced is the "is-close/related-to" relation. This is a weaker relation based on partial includes or limited association evidence (this can be used to solve disambiguation based on older or informal administrative hierarchy structures (e.g., pizza Charlton Andover)).

Based on the number of points in the clouds for Paris, France, and Paris, Tex., a measure of relative importance ("static rank") can be extracted and this information used to recall the most plausible entity in user queries when the disambiguation is missing.

With respect to extracting aliases and alternative names, during the clustering/segmentation phase, some extracted clouds of points (of the same type) might sometimes overlap. While in actuality two locations of the same name do not share the same physical space, this can occur when people use different names for the same entity, and in the case of misspellings. For example, the cloud of Paris, FR may overlap with the cloud Pari, Pariis, and the cloud of "Texas" will overlap with the cloud of "TX". These entities can be merged to provide the alternative, informal, misspelled, short names. Additionally, the number of points in the alternative clouds can be used as measure of popularity of that name (name static rank).

Note that this method can be applied at any level (e.g., city, street, neighborhood, etc.), that the latitude and the longitude can be replaced by postcodes or any other geocodes, that the number of streets and house numbers and the area of a location can all be used as static rank and extracted with this method. The data store does not have to contain businesses, but it can contain persons or any other entities with some form of spatial attributes.

In a second example that extracts informal/historical regions, after having extracted the geo-ontology, grouping can be performed on the populated places by common prefixes, suffixes, or other name features. For example, with respect to the populated places around the river Thames, some of these populated places have names such as Stratford upon Thames. By grouping the populated places, the boundary of the informal region "Thames" can be extracted. The same type of clustering, relation inference, and static rank extraction can be applied.

In a third example that extracts informal neighborhoods from business names, assume the same entity set as in the first example above. In some cultures, "local" business entities such as restaurants and hotels have a tendency to incorporate the neighborhood name in their own name (e.g., "Downtown Sushi" or "Sheraton Soho"). By filtering for frequent keywords that appear in the business names (e.g., downtown, soho) and using similar clustering and relation inference techniques as above, clouds of entities can be extracted that share the same informal neighborhood and ingest the corresponding neighborhoods into the formal geo-ontology.

If desired, automatic augmentation from external lists of locations (that could not be inferred and come from an external source that does not contain relation information) can be realized using probabilistic relation inference mechanisms based on neighboring entities. Geo-ontology spatial indexing can be used for fast lookups.

Natural boundaries (such as big rivers) can be detected at the city level and islands can be extracted at country level. The road network can also be extrapolated to some extent within cities by detecting line patterns in the city's point cloud.

By clustering/segmentation, it is to be understood that algorithms that extract subgroups (or splits into categories) from a given set of abstract points in an abstract feature space can be used. The disclosed architecture uses one of the algorithms in this class on a set of entities with spatial attributes to extract the formal and informal geo-ontology (e.g., locations, relations, attributes, boundaries, aliases, static ranks).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
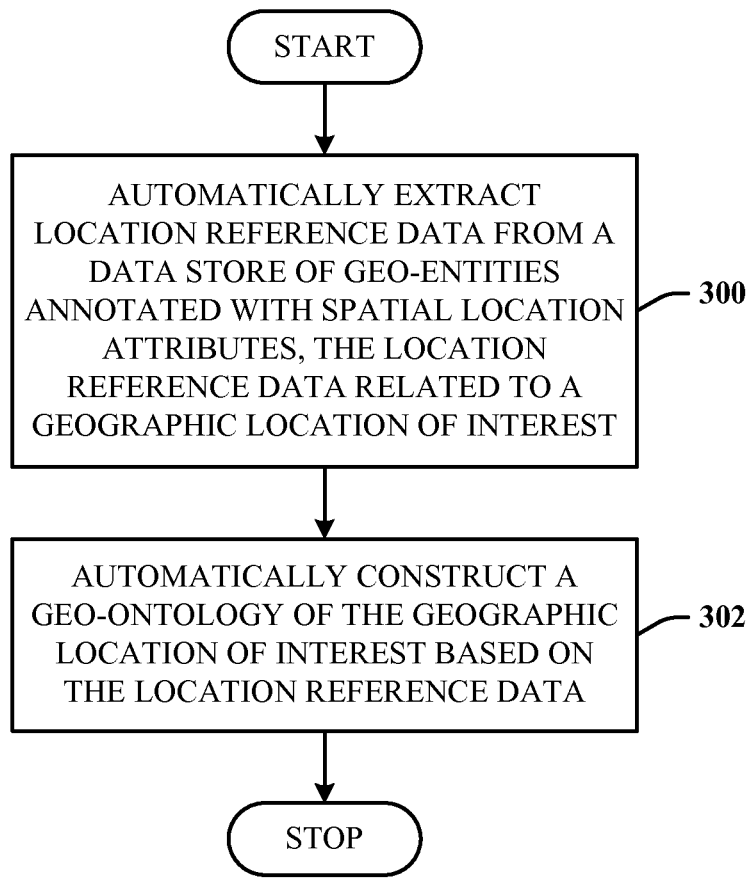
FIG. 3 illustrates a method in accordance with the disclosed architecture.

FIG. 3 illustrates a method in accordance with the disclosed architecture. At 300, location reference data is automatically extracted from a data store of geo-entities annotated with spatial location attributes. The location reference data is related to a geographic location of interest. At 302, a geo-ontology of the geographic location of interest is automatically constructed based on the location reference data.

Figure 4:
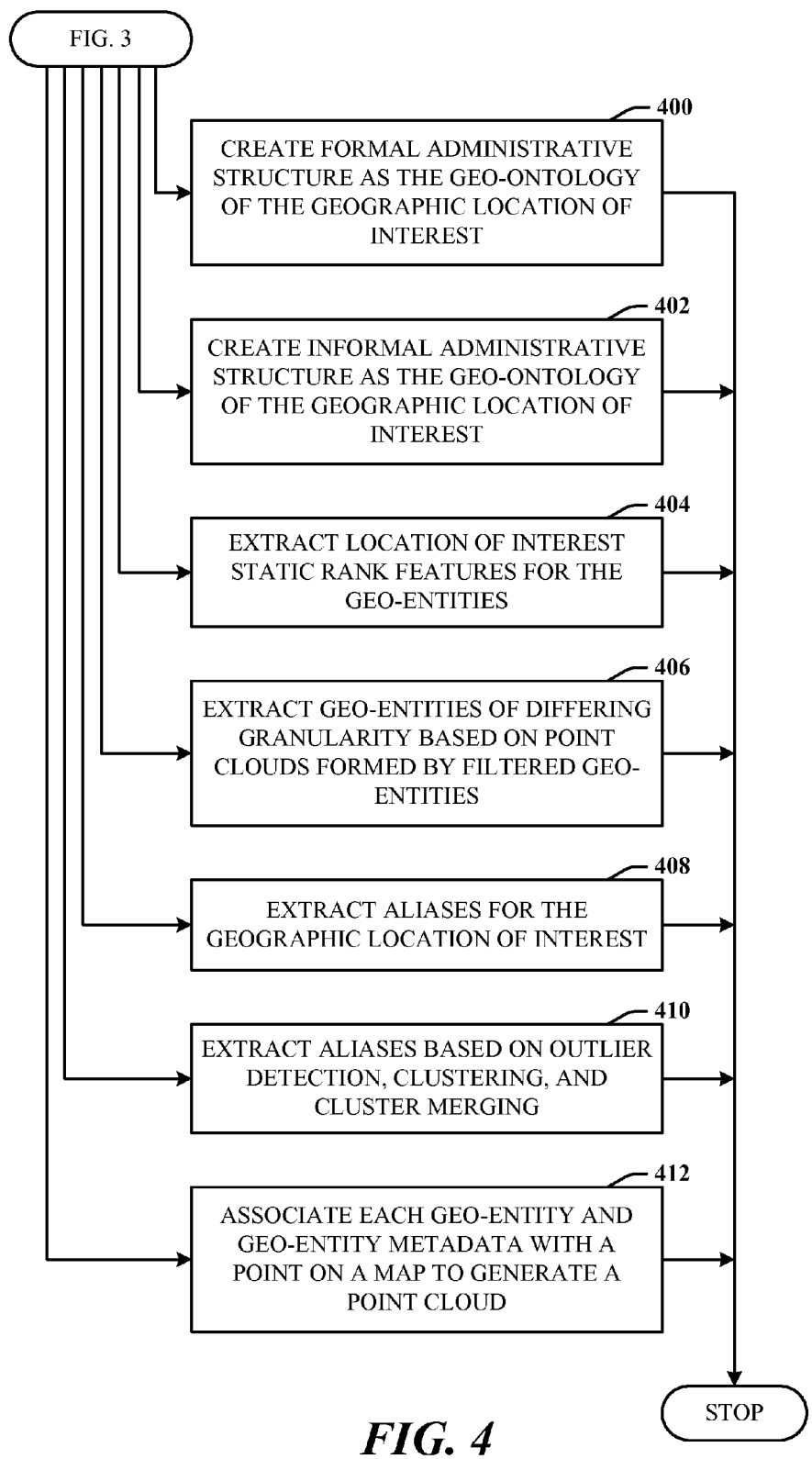
FIG. 4 illustrates further aspects of the method of FIG. 3.

FIG. 4 illustrates further aspects of the method of FIG. 3. Note that the flow indicates that each block can represent a step that can be included, separately or in combination with other blocks, as additional aspects of the method represented by the flow chart of FIG. 3. At 400, a formal administrative structure is created as the geo-ontology of the geographic location of interest. At 402, an informal administrative structure is created as the geo-ontology of the geographic location of interest. At 404, static rank features of the location of interest are extracted for the geo-entities. At 406, geo-entities of differing granularity are extracted based on point clouds formed by filtered geo-entities. At 408, aliases are extracted for the geographic location of interest. At 410, aliases are extracted based on outlier detection, clustering, and cluster merging. At 412, each geo-entity and associated geo-entity metadata are associated with a point on a map to generate a point cloud.

Figure 5:
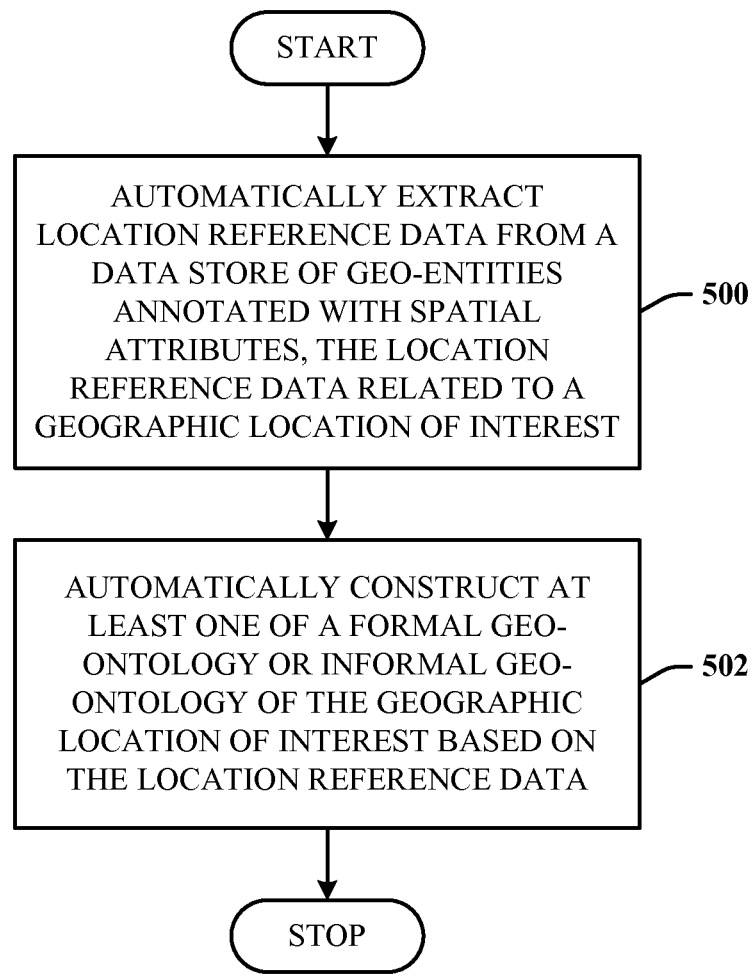
FIG. 5 illustrates an alternative method.

FIG. 5 illustrates an alternative method. At 500, location reference data is automatically extracted from a data store of geo-entities annotated with spatial attributes. The location reference data is related to a geographic location of interest. At 502, at least one of a formal geo-ontology or informal geo-ontology of the geographic location of interest is automatically constructed based on the location reference data.

Figure 6:
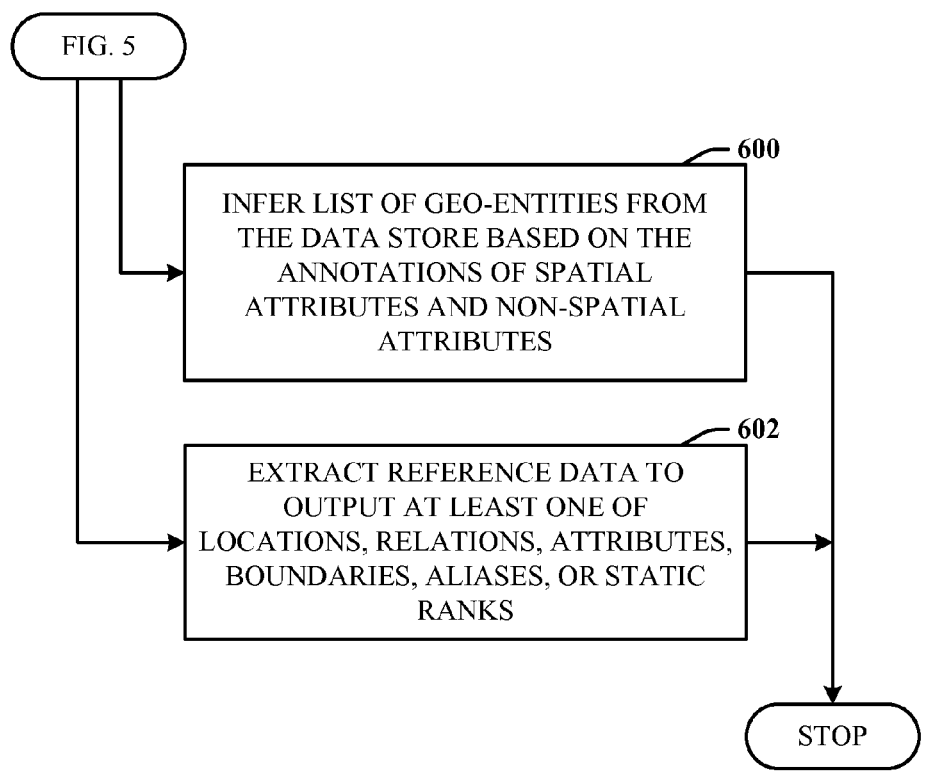
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, a list of geo-entities is inferred from the data store based on the annotations of spatial attributes and non-spatial attributes. At 602, reference data is extracted to output at least one of locations, relations, attributes, boundaries, aliases, or static ranks.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
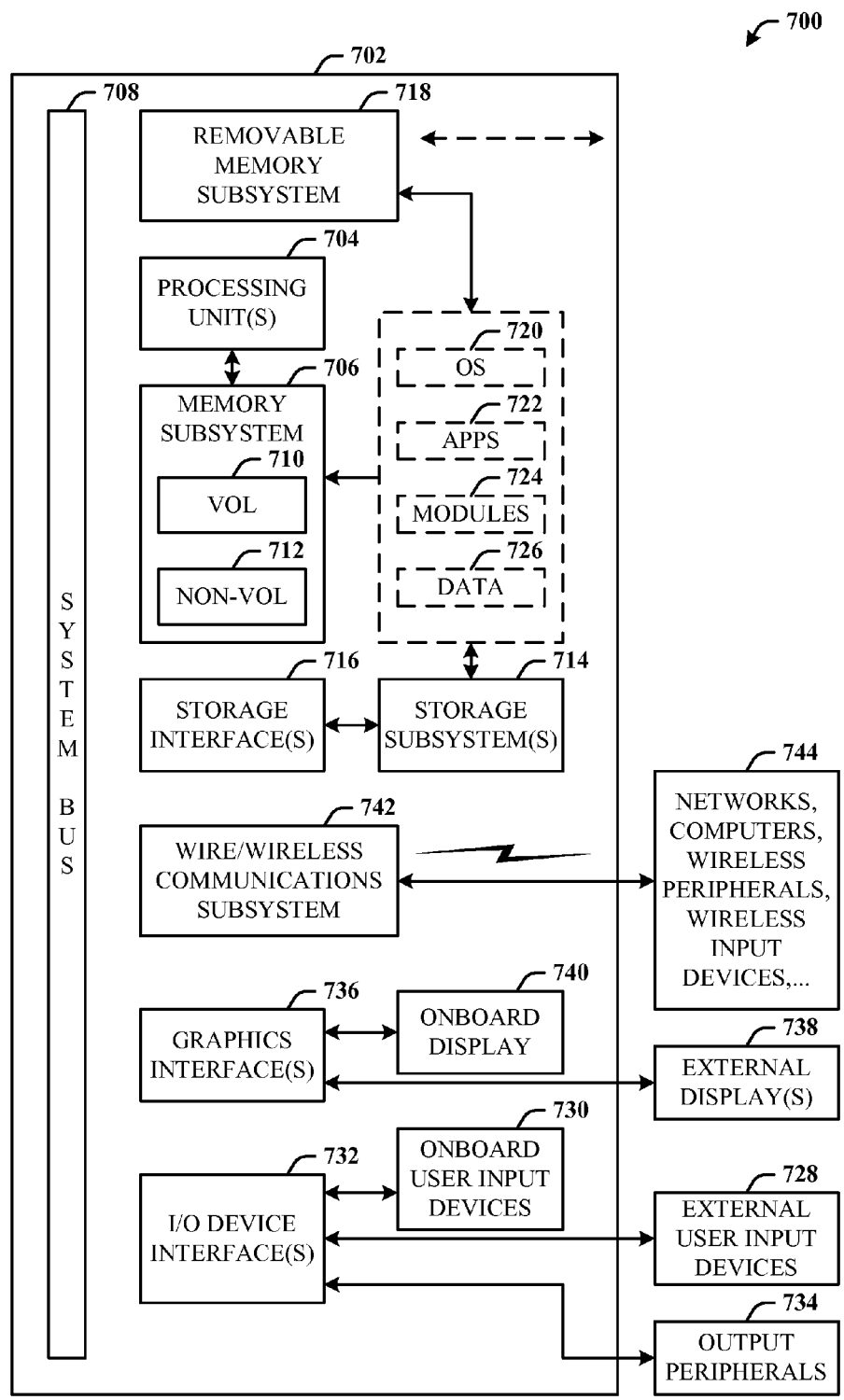
FIG. 7 illustrates a block diagram of a computing system that executes automatic geo-ontology extraction in accordance with the disclosed architecture.

Referring now to FIG. 7, there is illustrated a block diagram of a computing system 700 that executes automatic geo-ontology extraction in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include entities and components of the system 100 of FIG. 1, entities and components of the flow diagram 200 of FIG. 2, and the methods represented by the flowcharts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A memory device and a hardware processor respectively configured to store and execute instructions that implement a system, the system comprising:
an extraction component configured to automatically extract location reference data from a data store of geo-entities, the location reference data includes a list of geo-entities, a measure of relative importance of the geo-entities, and static rank attributes, the location reference data annotated with spatial location attributes and non-spatial attributes, the location reference data comprises location names related to a geographic region of interest, the spatial location attributes and non-spatial location attributes employed to associate each geo-entity with a point on a map to generate a point cloud on a multi-dimensional map, the static rank attributes used to recall a correct location in a user query to distinguish a same location name, the extraction component configured to perform automatic augmentation from external lists of locations using a probabilistic relation inference mechanism; and
a construction component configured to automatically reconstruct a geo-ontology of the geographic region of interest based on a geographical clustering of the location names within the extracted location reference data, the reconstructed geo-ontology is spatially indexed and comprises location boundaries of the geographical region of interest associated with the location names, and, further comprises aliases and alternative names generated based on clustering and segmentation of clouds of points.

2. The system of claim 1, wherein the reconstructed geo-ontology includes at least one of the geo-entities, relationships between the geo-entities, aliases, or inferred attributes used for detecting geo-entities in a user query and ranking the detected geo-entities.

3. The system of claim 1, wherein the reconstructed geo-ontology includes a formal administrative structure of the geographic region of interest.

4. The system of claim 1, wherein the reconstructed geo-ontology includes an informal administrative structure of the geographic region of interest.

5. The system of claim 1, wherein the extraction component infers a relationship between geo-entities based on an is-close/related-to relation.

6. The system of claim 1, wherein a polygonal boundary of a geo-entity is extracted.

7. The system of claim 1, wherein polygonal boundary, best center, relative importance, size, alias, most popular name, and names of parent entity are inferred from the point cloud.

8. The system of claim 1, wherein spatial inclusion defines relations between entities in the reconstructed geo-ontology.

9. A computer-implemented method, comprising computer-executable instructions that when executed by a hardware processor, cause the hardware processor to perform acts of:
extracting location reference data from a data store of geo-entities, the location reference data includes a list of geo-entities, a measure of relative importance of the geo-entities, and static rank attributes, the location reference data annotated with spatial location attributes and non-spatial location attributes, the location reference data includes location names related to a geographic location of interest, the spatial location attributes and non-spatial location attributes employed to associate each geo-entity with a point on a map to generate a point cloud on a multi-dimensional map, the static rank attributes used to recall a correct location in a user query to distinguish a same location name, the extraction component configured to perform automatic augmentation from external lists of locations using a probabilistic relation inference mechanism;
and
automatically reconstructing a geo-ontology of the geographic location of interest based on a geographical clustering of the location names within the extracted location reference data, the reconstructed geo-ontology spatially indexed and comprising location boundaries of the geographical location of interest associated with the location names, and, further comprising aliases and alternative names generated during clustering and segmentation of clouds of points.

10. The method of claim 9, further comprising creating a formal administrative structure as the reconstructed geo-ontology of the geographic location of interest.

11. The method of claim 9, further comprising creating an informal administrative structure as the reconstructed geo-ontology of the geographic location of interest.

12. The method of claim 9, further comprising extracting geo-entities of differing granularity based on point clouds formed by filtered geo-entities.

13. The method of claim 9, further comprising extracting the aliases for the geographic location of interest.

14. The method of claim 9, further comprising extracting the aliases based on cluster merging.

15. The method of claim 9, further comprising associating each geo-entity and geo-entity metadata with a point on a map to generate the point cloud.

16. The method of claim 9, further comprising extracting the aliases based on outlier detection and clustering.

17. A computer-implemented method, comprising computer-executable instructions that when executed by a hardware processor, cause the hardware processor to perform acts of:

extracting location reference data from a data store of geo-entities, the location reference data includes a list of geo-entities, a measure of relative importance of the geo-entities, and static rank attributes, the location reference data annotated with spatial attributes and non-spatial attributes, the location reference data comprises location names related to a geographic location of interest, the spatial location attributes and non-spatial location attributes employed to associate each geo-entity with a point on a map to generate a point cloud on a multi-dimensional map, the static rank attributes used to recall a correct location in a user query to distinguish a same location name, the extraction component configured to perform automatic augmentation from external lists of locations using a probabilistic relation inference mechanism; and automatically reconstructing a geo-ontology of the geographical region of interest comprising at least one of a formal geo-ontology or informal geo-ontology of the geographic location of interest based on a clustering of the location names of the location reference data as points on a map, the reconstructed geo-ontology is reconstructed without using pre-existing geo-ontology data, is spatially indexed, comprises location boundaries of the geographical region of interest associated with the location names, and, further comprises aliases and alternative names generated based on clustering and segmentation of clouds of points.

18. The method of claim 17, further comprising inferring a list of geo-entities from the data store based on the annotations of the spatial attributes and non-spatial attributes.

19. The method of claim 17, further comprising extracting reference data to output at least one of locations, relations, attributes, boundaries, aliases, or static ranks.

20. The method of claim 17, further comprising extracting the aliases based on outlier detection and clustering.

\* \* \* \* \*